Patented Oct. 6, 1925.

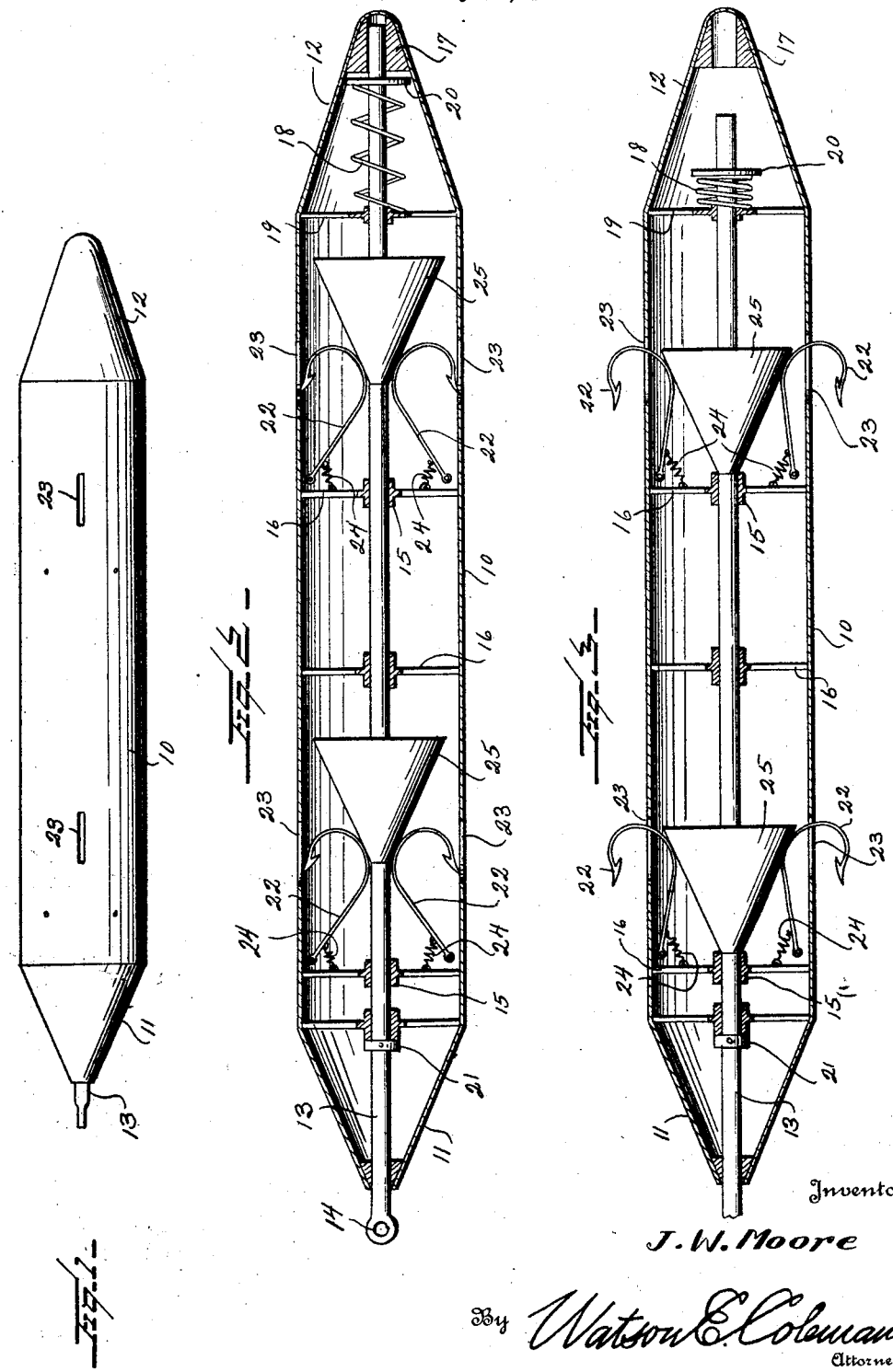

1,556,297

UNITED STATES PATENT OFFICE.

JOSEPH W. MOORE, OF OBERLIN, LOUISIANA, ASSIGNOR OF ONE-HALF TO RIPLEY G. CORKERN, OF OBERLIN, LOUISIANA.

ARTIFICIAL MINNOW.

Application filed July 19, 1924. Serial No. 727,012.

*To all whom it may concern:*

Be it known that I, JOSEPH W. MOORE, a citizen of the United States, residing at Oberlin, in the parish of Allen and State of Louisiana, have invented certain new and useful Improvements in Artificial Minnows, of which the following is a specification, reference being had to the accompanying drawings.

This invention relates to artificial bait, and particularly to a plug or artificial minnow.

One of the objects of the invention is to provide a device of this character having a number of normally retracted and concealed hooks, the device being so arranged that when a fish strikes, the hooks will be projected.

A further object is to provide a device of this character including an outer shell, a longitudinal shiftable rod normally held retracted within the shell and adapted to be connected to the fish line, and normally retracted hooks within the shell, these hooks being so arranged that when the fish strikes, the rod which is attached to the line will be moved forward in the direction of strain and this action will project the hooks.

Other objects will appear in the course of the following description.

My invention is illustrated in the accompanying drawings, wherein:—

Figure 1 is an elevation of my artificial minnow;

Fig. 2 is a longitudinal section with the hooks retracted, and

Fig. 3 is a like view to Fig. 2, but with the hooks projected.

Referring to these drawings, 10 designates the shell, which may be of any suitable form, color or material but which is shown as of thin metal, this shell being shown as approximately cylindrical in form and having tapered or conical ends 11 and 12, the end 12 being the rear end. Operating through the conical shell is a longitudinally extending rod 13, the forward end of which is formed with an eye 14 for the attachment of the fish line or cord. This rod is mounted in suitable bearings 15 carried by spiders 16 which engage the shell at intervals and support the rod for sliding movement. At its rear end the rod is mounted in the bearings 17 formed in the rear conical end of the portion 12. A spring 18 which bears at one end against a spider 19 and at the other end against a pin or other stop 20 urges the rod 13 in a rearward direction. A stop 21, which is adjustably mounted upon the rod 13 and is held in position, for instance, by a set screw, limits the rearward movement of this rod by engaging the forward bearing. Mounted on two of the spiders 16 are a plurality of hooks 22 which are pivotally mounted so as to swing outward through openings 23 formed in the shell. Springs 24 normally urge the hooks inward and resist their outward movement. For the purpose of forcing the hooks outward, I mount upon the rod 13 two conical spreaders 25.

With this device, when the fish strikes, the grip of the fish upon the outer shell 10 of the minnow halts the movement of this shell, but the rod 13 is drawn forward by the strain upon the line, and the spreaders 25 act to project the hooks out suddenly. If for any reason the fish should not be hooked, the springs 24 will retract the hooks and the spring 18 will retract the rod so as to re-set the device.

It will be seen that this device is very simple, positively operating, and that, as before remarked, it re-sets itself, which is not the case in an artificial bait, where the hooks are projected by a spring, these hooks being normally retracted and simply unlatched by the striking of a fish, in which case the artificial bait must be withdrawn and the device again set.

I claim:—

1. An artificial bait of the character described comprising a shell substantially conical at its end and having an axially aligned series of bearings herein, a longitudinally extending rod disposed within said bearings and projecting out of the forward end of the shell having means for the attaching of a line thereto, a plurality of sets of hooks, each hook being pivotally mounted within the shell, the shell being formed with openings opposite the bill of each hook and through which the bill of each hook may be projected or retracted, conical spreaders mounted upon the rod and coacting one with each set of hooks to cause the projection of the hooks when the rod is pulled forward relative to the shell, a spring urging the rod rearward, and springs for each hook urging each hook inward and against its corresponding spreader independently of any other hook.

2. An artificial bait comprising an outer hollow shell conical at opposite ends, the forward end of the shell being open, the rear end being formed with a longitudinally extending bearing, an axially disposed rod extending through the forward end of the shell and having its rear end supported in said bearing, spiders mounted at intervals within the shell and having bearings through which said rod runs, a stop limiting the rearward movement of the rod, a spring surrounding the rod at the rear end of the shell and bearing at one end against the rear most spider and at its rear end being operatively connected to the rod to thereby urge the rod rearward, a plurality of sets of hooks pivotally mounted upon certain of said spiders, each set being disposed concentric to the rod, springs, each spring being connected to a hook and to the corresponding spider and urging the hooks inward toward the rod, the shell having openings through which the bills of the hooks may be projected, and conical spreaders mounted upon the rod and associated with each set of hooks and against which the bills of the hooks bear when the hooks are retracted whereby as the rod is moved forward relative to the shell the hooks will be projected and as the rod is moved rearward by the spring the hooks will be retracted.

In testimony whereof I hereunto affix my signature.

JOSEPH W. MOORE.